United States Patent [19]

Cheng et al.

[11] Patent Number: 5,276,084
[45] Date of Patent: Jan. 4, 1994

[54] HIGH PERFORMANCE PRESSURE SENSITIVE ADHESIVE EMULSION

[75] Inventors: Tze-Chiang Cheng, Allentown; Chung-Ling Mao, Emmaus, both of Pa.

[73] Assignee: Air Products and Chemicals, Inc., Allentown, Pa.

[21] Appl. No.: 186,524

[22] Filed: Apr. 27, 1988

[51] Int. Cl.$^5$ .............................................. C08L 39/00
[52] U.S. Cl. ................................. 524/555; 526/307.5; 526/931
[58] Field of Search ...................... 524/555; 526/307.5, 526/931

[56] References Cited

U.S. PATENT DOCUMENTS

| | | | |
|---|---|---|---|
| 3,257,478 | 6/1966 | Jubilee et al. | 260/901 |
| 3,563,944 | 2/1971 | Bauer et al. | 260/29.6 |
| 3,654,213 | 4/1972 | Christenson et al. | 260/33.6 |
| 3,697,618 | 10/1972 | Grunewalder et al. | 260/78.5 |
| 3,890,292 | 6/1975 | Bohme et al. | 260/80.76 |
| 4,185,050 | 1/1980 | Lazear et al. | 525/221 |
| 4,322,516 | 3/1982 | Wiest et al. | 526/307.7 |
| 4,507,429 | 3/1985 | Lenney | 524/800 |
| 4,564,664 | 1/1986 | Chang et al. | 524/833 |
| 4,702,957 | 10/1987 | Mudge | 428/288 |

FOREIGN PATENT DOCUMENTS

| | | | |
|---|---|---|---|
| 0225541 | 6/1987 | European Pat. Off. | |
| 3531601 | 3/1987 | Fed. Rep. of Germany | |
| 0101174 | 6/1983 | Japan | 526/931 |

*Primary Examiner*—Joseph L. Schofer
*Assistant Examiner*—Peter D. Mulcaly
*Attorney, Agent, or Firm*—Michael Leach; James C. Simmons; William F. Marsh

[57] ABSTRACT

A pressure sensitive adhesive composition comprising an aqueous emulsion of a copolymer consisting essentially of (a) 10–40 wt % vinyl acetate, (b) 5–30 wt % ethylene, (c) 5–50 wt % alkyl acrylate, (d) 5–40 wt % dialkyl maleate or fumarate, (e) 1–5 wt % hydroxyalkyl (meth)acrylate, (f) 0.1–1 wt % (meth)acrylamide, and (g) 1–5 wt % alpha,beta ethylenically unsaturated carboxylic acid.

12 Claims, No Drawings

HIGH PERFORMANCE PRESSURE SENSITIVE ADHESIVE EMULSION

TECHNICAL FIELD

The present invention relates (o vinyl acetate/ethylene/acrylate copolymer emulsions suitable as pressure sensitive adhesive compositions.

BACKGROUND OF THE INVENTION

Most currently available pressure sensitive adhesive emulsions do not meet the performance requirements for vinyl applications in the adhesive market. Most of the adhesive products that are presently used for vinyl applications are solvent based. Needless to say the use of solvent based adhesives leads to environmental and workplace emissions problems.

For a pressure sensitive adhesive to be suitable for vinyl applications, i.e. the base stock is polyvinyl chloride which is most likely plasticized, the copolymer adhesive must have the following properties:

loop tack of greater than 1.5 pli (pounds per linear inch), 24 hour peel adhesion buildup of at least about 4 pli, high cohesive strength of at least 30 hours (PSTC-7) standard creep resistance, and suitable moisture resistance.

Of particular importance is the need for greater than about 4 pli peel adhesion buildup, for otherwise the vinyl base stock will peel off the substrate. Permanency is needed so that the vinyl base stock will be destroyed rather than peel off the substrate.

In the pressure sensitive adhesive art, cohesive strength is measured by shear strength or shear (creep) resistance, which is the resistance of adhesive joints to shear stresses and is measured as the force per unit area sheared at failure. Shear is parallel to the adhesive joint.

Peel or peel strength is measured by drawing an adhesive applied to a substrate at some angle to the substrate, usually 90° or 180°.

Tack or loop tack is the resistance offered by the adhesive film to detachment from an adhered surface. It is a measure of stickiness of an adhesive, or the ability to form an instant bond when brought into contact with a substrate to which adhesive is to be adhered.

Although many attempts have been made to enhance the shear strength of adhesive polymers, the tack and peel values of the resulting adhesive generally lessen with an increase in shear strength.

European Patent Application 0 225 541 discloses pressure sensitive adhesives comprising terpolymers of ethylene, vinyl acetate and di-2-ethylhexyl maleate or di-n-octyl maleate or the corresponding fumarate.

DE 3,531,601 discloses an aqueous pressure sensitive emulsion whose polymer comprises (a) 40-89 wt % vinyl ester, (b) 10-45 wt % ethylene, (c) 0.5-4 wt % unsaturated carboxylic and, (d) 0.5-10 wt % hydroxyalkyl acrylate, (e) 0-25 wt % alkyl acrylate, and (f) 0-10 wt % ethylenically mono-unsaturated or polyunsaturated comonomers.

U.S. Pat. No. 4,322,516 discloses pressure sensitive adhesive emulsion copolymers comprising (a) 10-30 wt % ethylene, (b) 29-69 wt % acrylic acid esters of alcohols, (c) 20-55 wt % vinyl acetate, (d) 0.2-8 wt % (meth)acrylamide, and (e) 0-12 wt % other olefinically unsaturated comonomers.

U.S. Pat. No. 4,507,429 discloses a pressure sensitive adhesive composition comprising a polymer of an acrylate ester and/or vinyl ester, an olefinically unsaturated carboxylic acid comonomer, and a polyolefinically unsaturated comonomer. The acrylate ester may be a diester of an alpha, beta-olefinically unsaturated dicarboxylic acid.

U.S. Pat. No. 4,564,664 discloses pressure sensitive adhesives which are polymers of a diester of fumaric acid, an alkyl acrylate, an alkyl methacrylate and, desirably, a crosslinkable carboxylic acid.

U.S. Pat. No. 4,702,957 discloses an aqueous emulsion for bonding nonwoven fabrics containing a vinyl ester, 10-30 wt % ethylene, 15-40 wt % dialkyl maleate and 1-5 wt % N-methylol containing comonomer.

U.S. Pat. No. 3,563,944 discloses the copolymerization of vinyl acetate with acrylates, acrylic acid, maleates and fumarates to provide an emulsion especially useful in a paint formulation.

U.S. Pat. No. 3,257,478 discloses pressure sensitive adhesives comprising vinyl acetate. octyl acrylate, ethyl acrylate and maleic anhydride. In addition, crosslinkable monomers such as N-methylolacrylamide are included.

U.S. Pat. No. 3,654,213 discloses a pressure sensitive adhesive comprising a polymer base of 2-ethylhexyl acrylate, vinyl acetate, acrylic acid and a mixed vinyl ester of an alkanoic acid containing 10-12 carbon atoms.

U.S Pat. No. 3,697,618 discloses an acrylic pressure sensitive adhesive consisting of a vinyl ester of a saturated monocarboxylic acid, e.g. vinyl acetate, and an alpha,beta-ethylenically unsaturated dicarboxylic acid.

U.S. Pat. No. 3,890,292 discloses a pressure sensitive adhesive comprising an alkyl acrylate, an alpha,beta-unsaturated carboxylic acid such as acrylic acid, a vinyl ester, e.g. vinyl acetate, and a plasticizer such as dibutyl phthalate. Emulsion polymerization techniques are employed.

U.S. Pat. No. 4,185,050 discloses a pressure sensitive adhesive comprising a terpolymer of an alkyl acrylate, a vinyl ester and an ethylenically unsaturated carboxylic acid.

SUMMARY OF THE INVENTION

The invention provides an emulsion copolymer suitable as a pressure sensitive adhesive in which the copolymer consists essentially of (a) 10-40 wt % vinyl acetate, (b) 5-30 wt % ethylene, (c) 5-50 wt % alkyl acrylate (d) 5-40 wt % dialkyl maleate or fumarate, (e) 1-5 wt % 2-hydroxyalkyl (meth)acrylate, (f) 0.1-1 wt % (meth)acrylamide, and (g) 1-5 wt % alpha,beta-ethylenically unsaturated carboxylic acid. The proportions of the various monomers should be selected to provide a copolymer with a Tg of less than about −20° C. and polymerization should be such as to provide a molecular weight greater than about 200,000.

The emulsion copolymers provided by the present invention possess the necessary balance of physical properties that are required for a high performance pressure sensitive adhesive suitable for vinyl applications such as transfer tapes. The copolymers have loop tack of greater than 1.5 pli, 24 hour peel adhesion of at least about 4 pli, cohesive strength of at least 30 hours creep resistance, and moisture resistance. The adhesive emulsion copolymer also demonstrates acceptable light, UV and thermal resistance and also resists plasticizer migration from the polyvinyl chloride base stock.

The addition of a dialkyl maleate or fumarate comonomer surprisingly improves the adhesion and moisture resistance compared to a similar emulsion copolymer lacking this comonomer.

DETAILED DESCRIPTION OF THE INVENTION

The performance properties of vinyl acetate/ethylene/acrylate copolymer emulsions as pressure sensitive adhesive compositions are significantly improved by the incorporation of a dialkyl maleate or fumarate during the emulsion polymerization. The key performance properties include peel strength, loop tack strength, peel adhesion buildup, water/moisture resistance and aging behavior. The improvement in the balance of these properties is achieved by regulating the specific composition and level of monomer units in the polymer chain.

The aqueous emulsion comprises a colloidal dispersion in water of a copolymer consisting essentially of
(a) 10–40 wt % vinyl acetate,
(b) 5–30 wt % ethylene,
(c) 5–50 wt % $C_4$–$C_8$ alkyl acrylate,
(d) 5–40 wt % di-($C_1$–$C_{13}$)alkyl maleate or fumarate.
(e) 1–5 wt % 2-hydroxyalkyl (meth)acrylate,
(f) 0.1–1 wt % (meth)acrylamide, and
(q) 1–5 wt % alpha,beta ethylenically unsaturated monocarboxylic acid. The emulsion copolymers have a Tg of less than $-20°$ C., preferably $-330°$ to $-70°$ C., and a molecular weight of greater than about 200,000, preferably about 300,000 to 1,000,000. The aqueous emulsions would be about 50 to 70 wt % solids with the copolymer preferably containing 10 to 30 wt % vinyl acetate and 8 to 20 wt % ethylene.

Contemplated as the functional, or operative, equivalent of vinyl acetate in the copolymer emulsions are vinyl esters of formic acid and other $C_3$–$C_{18}$ alkanoic acids, such as vinyl propionate, vinyl butyrate, vinyl laurate and the like.

As component (c) in the emulsion copolymer, the alkyl acrylate may be an ester of acrylic acid or methacrylic acid with a $C_4$–$C_8$ alcohol such as butyl acrylate, hexyl acrylate, preferably 2-ethylhexyl acrylate, and the like. It is preferred to have about 10 to 40 wt % of the alkyl acrylate, especially the 2-ethylhexyl acrylate, in the copolymer.

As the dialkyl maleate or fumarate, one may suitably use the diesters of maleic acid or fumaric acid with a $C_1$–$C_{13}$, preferably $C_4$–$C_8$, alcohol such as octyl alcohol, isooctyl alcohol, butyl alcohol. isobutyl alcohol, methyl alcohol, amyl alcohol and the like, preferably in an amount of 15 to 35 wt %.

Component (e) at preferably 1 to 4 wt % may suitably be 2-hydroxyethyl or 2-hydroxypropyl acrylate or methacrylate. The component (f) acrylamide, at preferably 0.1 to 0.5 wt %, may suitably be acrylamide or methacrylamide.

The alpha,beta ethylenically unsaturated $C_3$–$C_6$ carboxylic acid can be methacrylic acid, crotonic acid, and preferably acrylic acid. The preferred amount of the carboxylic acid comonomer in the copolymer is about 1 to 4 wt %.

The monomers are copolymerized in the presence of a stabilizing system in an aqueous medium under ethylene pressure not exceeding about 100 atm and in the presence of a free radical source which is added incrementally. The process first involves a homogenization in which the vinyl acetate, dialkyl maleate (fumarate) and acrylamide suspended in water are thoroughly agitated in the presence of ethylene under the working pressure to effect solution of the ethylene in the vinyl acetate and maleate diester while the reaction medium is gradually heated to polymerization temperature. The homogenization period is followed by a polymerization period during which the free radical source (and an optional reductant) is added incrementally.

Although the alkyl acrylate, carboxylic acid comonomer and the hydroxyalkyl acrylate may be added all at once with the initial charge, it is preferred to add these monomers incrementally over the course of the polymerization reaction.

Various free-radical generating materials can be used in carrying out the polymerization of the monomers, such as peroxide compounds, with thermal initiation. Combination systems employing both reducing agents and oxidizing agents can also be used, i.e. a redox system. The reducing agent is often referred to as an activator and the oxidizing agent as an initiator. Any free-radical generating material or redox system known in the polymerization art can be used to polymerize the monomers. The oxidizing agent is generally employed in an amount of 0.01 to 1%, preferably, 0.05 to 0.5%, based on the weight of the vinyl acetate introduced into the polymerization system. The reducing agent is ordinarily added in the necessary equivalent amount.

Emulsifying agents composing the stabilizing system which can be used in the polymerization recipe include ionic and nonionic surfactants, preferably the anionic types which are well known to those skilled in the polymerization art. Other emulsifying agents which may be used include protective colloids, such as polyvinyl alcohol and the cellulose materials such as methyl cellulose, hydroxyethyl cellulose, hydroxypropyl methyl cellulose and the like.

The concentration range of the total amount of the emulsifying agents useful is from 0.5 to 10%, based on total emulsion.

Vinyl acetate/ethylene/acrylate copolymer emulsions of relatively high solids content can be directly produced, e.g. 50–70% solids.

The reaction time will depend upon variables such as the temperature, the free radical forming source and the desired extent of polymerization. It is generally desirable to continue with the reaction until less than 3% of the vinyl acetate remains unreacted.

In carrying out the polymerization, the vinyl acetate, dialkyl maleate (fumarate), acrylamide and optionally an amount of the acrylic acid and alkyl acrylate are initially charged to the polymerization vessel and saturated with ethylene. The remainder of the carboxylic acid monomer and alkyl acrylate monomer is added incrementally during the course of the polymerization along with the hydroxyalkyl acrylate.

When reference is made to incremental addition, substantially uniform additions, both with respect to quantity and time, and intermittent additions are contemplated. Such additions are also referred to as "delay" additions.

The quantity of ethylene entering into the copolymer is influenced by the pressure, the agitation and the viscosity of the polymerization medium. Thus, to increase the ethylene content of the copolymer, higher pressures, greater agitation and a low viscosity are employed.

The process of forming the vinyl acetate/ethylene/acrylate copolymer emulsion generally comprises preparation of an aqueous solution containing at least some of the stabilizing system. This aqueous solution and the initial charge of monomers are added to the polymerization vessel and ethylene pressure is applied to the desired value. As previously mentioned, the mixture is thoroughly agitated to dissolve ethylene in the monomers and in the water phase. Conveniently, the charge is brought to polymerization reaction temperature during this agitation. The polymerization is then initiated by introducing initial amounts of the oxidizing agent when using thermal initiation and also the reducing agent when using a redox system. After the polymerization has started, the oxidizing agent (and reducing agent) are incrementally added as required to continue polymerization. The remaining monomers may be added as delays, separately or in combination.

The following general procedure is followed in preparing the emulsions of the Runs in the Examples.

To the reactor, a premix of water, surfactants, acrylamide and ethylenically unsaturated carboxylic acid is added. The pH of the premix is adjusted to about 3.5 with 50% ammonium hydroxide. Vinyl acetate and dialkyl maleate are subsequently charged into the reactor followed by nitrogen and ethylene purge. The reactor is then sealed and stirred while being heated. When the reactor temperature reaches about 50° C., ethylene is charged and equilibrated at the requisite elevated pressure for about 15 minutes and shut off. The agitator speed is raised. The oxidizing agent and reducing agent feeds are commenced.

In about 10-15 min, the polymerization is initiated as indicated by the small temperature/pressure rise. About 5 min after the initiation, the alkyl acrylate, hydroxyalkyl acrylate and carboxylic acid comonomer and emulsifier delay feeds are started. When the comonomer and emulsifier delay feeds are completed, the oxidizing agent and reducing agent feeds are continued until the free vinyl acetate content is less than about 3% (approximately 3 more hrs). At the end of the oxidizing agent and reducing agent delay feeds, the reaction mixture is transferred to a degasser and vacuum applied. A t-butyl hydrogen peroxide solution is added to the degasser followed by sodium formaldehyde sulfoxylate solution. Where thermal initiation is used, there is no reducing agent feed.

EXAMPLE 1

This Example demonstrates the preparation of a copolymer emulsion of the invention.

Run 14 was a redox initiation with the polymerization conditions being 50° C., 840 psig ethylene pressure, and 800 rpm in a 1 gal stainless steel reactor for 8 hrs. The initial charge and the delayed feeds were as shown in Table 1. The oxidizing agent and reducing agent solutions were added at a rate of 0.45 ml/min for 8 hr. The monomers feed was added at 3.2 ml/min for 2.5 hr and then 2.4 ml/min for 2.5 hr. The emulsifier delay feed was 0.8 ml/min for 2.5 hr and then 0.6 ml/min for 1.5 hr.

TABLE 1

INITIAL CHARGE

TABLE 1-continued

| | | | |
|---|---|---|---|
| 1. | Water | 870.0 | |
| 2. | Rewoderm S 1333 (40%) | 26.6 | |
| 3. | Rewopol NOS 25 (35%) | 51.7 | |
| 4. | Sodium Vinyl Sulfonate (25%) (SVS) | 11.9 | |
| 5. | Acrylamide (50%) (AAm) | 14.2 | |
| 6. | Acrylic Acid (AA) | 14.2 | |
| 7. | Ferrous Ammonium Sulfate (1.0%) | 1.7 | |
| 8. | 50% NH4OH, Adjust pH to 3.5 | | |
| 9. | Vinyl Acetate (VAc) | 581.3 | |
| 10. | Dioctyl Maleate (DOM) | 461.0 | |

| | | Delay Feeds | | |
|---|---|---|---|---|
| 1. | Oxidizing (7%) Agent | Ammonium Persulfate | 15.0 g | |
| | | Ammonia (24%) | 9.0 | |
| | | Water | 190.0 | 214.0 g |
| 2. | Reducing (3.6%) Agent | Sodium Formaldehyde Sulfoxylate | 7.5 g | |
| | | Water | 200.0 | 205.5 g |
| 3. | Monomers | 2-Ethylhexyl Acrylate (2-EHA) | 679.2 g | |
| | | Acrylic Acid (AA) | 32.4 | |
| | | 2-Hydroxyethyl Acrylate (2-HEA) | 110.9 | 822.5 g |
| 4. | Emulsifier | Rewopol NOS 25 (35%) | 360.0 g | |
| | | Water | 110.0 | 470.0 g |

| The Run 14 emulsion had the following properties: | |
|---|---|
| Free Monomer (VAc), % | 1.34 |
| pH | 4.30 |
| Solids, % | 54.0 |
| Viscosity @ 20 rpm | 3000.0 |
| Accelerated Sediment, % | 1.0 |
| Grits (100 mesh screen), ppm | 100.0 |

The emulsions of Runs 11 (no maleate) and 13, 15 and 16 were prepared following this procedure.

EXAMPLE 2

In this Example the preparation of a copolymer emulsion of the invention using thermal initiation is demonstrated by Run 12.

The polymerization was performed at 65° under an ethylene pressure of 840 psig at 800 rpm in a 1 gal stainless steel reactor. The polymerization reaction was carried out for 8 hr. The oxidizing agent solution was added at a rate of about 0.32 ml/min over an 8 hr period. The monomers delay feed was first added at 3.2 ml/min for 2.5 hr and then 2.4 ml/min for 2.5 hr. The emulsifier delay feed was added first at 0.8 ml/min for 2.5 hr and then 0.6 ml/min for 1.5 hr.

TABLE 2

| INITIAL CHARGE | | |
|---|---|---|
| 1. Water | 720.1 | |
| 2. Rewoderm S 1333 (40%) | 21.3 | |
| 3. Rewopol NOS 25 (35%) | 41.4 | |
| 4. Sodium Vinyl Sulfonate (25%) | 9.5 | |
| 5. Acrylamide (50%) | 14.2 | |
| 6. Acrylic Acid (AA) | 14.2 | |
| 7. Ferrous Ammonium Sulfate (1.0%) | 1.7 | |
| 8. 50% NH4OH, Adjust pH to 3.5 | | |
| 9. Vinyl Acetate | 580.3 | |
| 10. 2-Ethylhexyl Acrylate | 77.7 | |
| 11. Dioctyl Maleate | 371.2 | |

| | | Delay Feeds | | |
|---|---|---|---|---|
| 1. | Oxidizing (7.0%) Agent | Ammonium Persulfate | 15.0 | |
| | | Ammonia (24%) | 9.0 | |
| | | Water | 190.0 | 214.0 |
| 2. | Monomers | 2 Ethylhexyl Acrylate | 787.4 | |
| | | Acrylic Acid | 27.0 | |
| | | 2-Hydroxyethyl Acrylate | 92.4 | 906.8 |
| 3. | Emulsifier | Rewopol NOS 25 (35%) | 360.0 | |
| | | Water | 110.0 | 470.0 |

| The resulting Run 12 emulsion had the following properties: | |
|---|---|
| Free Monomer (VAM) % | 3.77 |
| pH | 4.27 |

TABLE 2-continued

| | |
|---|---|
| Solids, % | 56.0 |
| Viscosity @ 20 rpm | 5850.0 |
| Accelerated Sedimentation, % | 1.0 |
| Grits, (100 mesh), ppm | 31.8 |

EXAMPLE 3

Table 3 shows data for emulsions of Runs 1-10 in which Runs 2-10 contain various dialkyl maleates at 10 wt % using plasticized PVC film as facestock in pressure sensitive adhesive construction. The emulsions of Runs 1-10 were prepared generally following the procedure of Example 1.

TABLE 3

| RUN | DIALKYL MALEATE OR FUMARATE (wt %) | 180° Peel (pli) 30 min DWELL | 180° Peel (pli) 24 hr DWELL | Loop Tack (pli) | Shear (hr) |
|---|---|---|---|---|---|
| 1 | None (control) | 2.8 | 3.4 | 2.5 | 107 |
| 2 | Diethyl Maleate (10) | 3.1 | 3.9 | 1.6 | 115 |
| 3 | Dibutyl Maleate (30) | 3.9 | 5.3 | 3.3 | 92 |
| 4 | Diisobutyl Maleate (30) | 4.2 | 5.1 | 2.3 | 29 |
| 5 | Diisobutyl Maleate (10) | 3.1 | 3.8 | 2.4 | 218 |
| 6 | Diamyl Maleate (10) | 3.4 | 3.4 | 0.9 | 114 |
| 7 | Dimethylamyl Maleate (10) | 3.5 | 3.5 | 1.1 | 65 |
| 8 | Dioctyl Maleate (30) | 4.2 | 4.8 | 3.3 | 30 |
| 9 | Dioctyl Fumarate (30) | 4.0 | 5.0 | 1.9 | 16 |
| 10 | Bistridecyl Maleate (10) | 3.0 | 3.7 | 2.8 | 5 |

Compared to Run 1 in which there was no dialkyl maleate present, Runs 2-10 showed improvement in 180° peel strength; Runs 3, 8 and 10 showed increased tack and Runs 2, 5 and 6 showed increased shear.

EXAMPLE 4

This example compares the adhesive performance of five vinyl acetate/ethylene/acrylate emulsion copolymers containing a dialkyl maleate to Run 11 as the control containing no dialkyl maleate.

TABLE 4

| POLYESTER FACESTOCK | | | | | | |
|---|---|---|---|---|---|---|
| RUN | DIALKYL MALEATE (wt %) | COAT WT (g/m$^2$) | LOOP TACK (pli) | 180° Peel 30 min | 180° Peel 24 hr | SHEAR STRENGTH (hr) |
| 11 | none | 25.0 | 1.4 A | 2.9 A | 3.2 A | 200C |
| 12 | Dioctyl (20) TI | 26.8 | 2.8 A | 3.5 A | 4.1 A | 132C |
| 13 | Dioctyl (20) | 26.8 | 2.3 A | 3.8 A | 4.2 A | 153C |
| 14 | Dioctyl (30) | 25.5 | 2.6 A | 4.0 A | 4.5 A | 89C |
| 15 | Diisobutyl (30) | 26.0 | 1.4 A | 3.1 A | 3.8 A | 56C |
| 16 | Dibutyl (30) | 25.2 | 2.1 A | 3.9 A | 4.4 A | 109C |

TEST SUBSTRATE - STAINLESS STEEL
TRANSFER COATED FROM POLYSILK RELEASE LINER
TI - THERMAL INITIATION
A - ADHESIVE FAILURE
C - COHESIVE FAILURE

It can be seen from the data that when used as the pressure sensitive adhesive for a polyester base stock and a stainless steel substrate, the emulsion copolymers containing the dialkyl maleate showed improvement in the area of adhesion buildup and loop tack with minimum decrease in cohesion.

EXAMPLE 5

In this example the same emulsions of Example 4 were evaluated for adhesive properties using a polyvinyl chloride base stock and a stainless steel substrate with performance data obtained for the adhesives before aging and after aging.

TABLE 5

| POLYVINYL FEEDSTOCK | | | | | | | |
|---|---|---|---|---|---|---|---|
| RUN | DIALKYL MALEATE (wt %) | COAT WT (g/m$^2$) | LOOP TACK (pli) | 180° peel 30 min | 180° peel 24 hr | SHEAR STRENGTH (hr) | VINYL SHRINKAGE (in.) |
| 11 BA | none | 33 | 2.5 A | 2.8 A | 3.4 A | 107 C,AT | |
| AA | | | 1.6 A | 2.5 A | | 200 C | 1/16 |
| 12 BA | Dioctyl (20) TI | 33.5 | 3.2 A | 3.6 A | 4.8 A | 39 AT | |
| AA | | | 3.0 A | 3.2 A | | 153 A,AT | 1/16 |
| 13 BA | Dioctyl (20) | 32 | 2.7 A | 3.7 A | 4.9 A | 77 C | |
| AA | | | 2.2 A | 3.0 A | | 200 C | 1/16 |
| 14 BA | Dioctyl (30) | 32.5 | 3.3 A | 4.2 A | 4.8 A | 30 C | |
| AA | | | 1.9 A | 2.7 A | | 150 C | 1/16 |
| 15 BA | Diisobutyl (30) | 31.5 | 2.3 A | 4.2 A | 5.1 A | 29 C | |
| AA | | | 1.7 A | 3.2 A | | 150 C | 1/32 |
| 16 BA | Dibutyl (30) | 33 | 3.3 A | 3.9 A | 5.3 A | 92 C | |

TABLE 5-continued

| | | POLYVINYL FEEDSTOCK | | | | |
|---|---|---|---|---|---|---|
| RUN | DIALKYL MALEATE (wt %) | COAT WT (g/m²) | LOOP TACK (pli) | 180° peel 30 min / 24 hr | SHEAR STRENGTH (hr) | VINYL SHRINKAGE (in.) |
| AA | | | 2.0 A | 3.0 A | 150 C | 1/32 |

TI - THERMAL INITIATION
A - ADHESIVE FAILURE
C - COHESIVE FAILURE
AT - ADHESIVE TRANSFER
BA - BEFORE AGING (before thermal aging)
AA - AFTER AGING (after thermal aging at 70° C. for one week)

EXAMPLE 6

This example shows the performance data for the Run 12 emulsion copolymer compared to the performance data disclosed for Emulsions 1-3 of Table III in European Patent Application 0 225 541 (NS 1, NS 2 and NS 3) and two prior art pressure sensitive adhesive emulsion copolymers (PA 1 and PA 2).

TABLE 6

| RUN | PEEL ADHESION (lbs) 20 min | PEEL ADHESION (lbs) 24 hrs | SHEAR (hrs) 2 psi/180 | LOOP TACK (oz) |
|---|---|---|---|---|
| NS 1 | 3.5 | 5.1 | 1.7 | 46 |
| NS 2 | 4.0 | 4.5 | 1.1 | 61 |
| NS 3 | 3.6 | 4.3 | 2.3 | 48 |
| PA 1 | 5.6 | 5.6 | 0.8 | 56 |
| PA 2 | 5.4 | 5.5 | 3.6 | 48 |
| 12 | 3.5 | 4.1 | 153 | 45 |

It can be seen from the data in Table 6 that the emulsion copolymer of Run 12 according to the invention did not fail under the shear test after 153 hours. The emulsion copolymers of NS 1, 2 and 3 were vinyl acetate/ethylene/di-2-ethylhexyl maleate terpolymers with NS 3 also containing 1% acrylic acid.

EXAMPLE 7

This example shows the effect of dioctyl maleate incorporation into the vinyl acetate/ethylene/acrylate emulsion copolymers on moisture sensitivity. Each vinyl laminate was exposed to 100° F. and 95% relative humidity for 1 week and then subject to 180° peel test immediately upon removal from the temperature-humidity chamber. It can be seen that the emulsion copolymers according to the invention (Runs 17-19) showed significantly superior peel strength than the two prior art materials, one which did not contain any dioctyl maleate and the other which did not contain any ethylene.

TABLE 7

| RUN | DIOCTYL MALEATE (WT %) | 180° PEEL* (pli) | HAZE |
|---|---|---|---|
| 1 | 0 | 0.1 | Poor |
| pA 1 | 65 | 0.1 | poor |
| 17 | 10 | 5.4 | Good |
| 18 | 15 | 6.9 | Good |
| 19 | 20 | 6.5 | Good |

*Tested immediately after humidity chamber.

STATEMENT OF INDUSTRIAL APPLICATION

The present invention provides a vinyl acetate/ethylene/acrylate emulsion copolymer suitable for use as a pressure sensitive adhesive composition, particularly finding application with vinyl base stock.

We claim:

1. A pressure sensitive adhesive composition comprising an aqueous emulsion of a copolymer having a Tg of less than about −20° C. consisting essentially of
   (a) 10–40 wt % vinyl acetate,
   (b) 5–30 wt % ethylene,
   (c) 5–50 wt % alkyl acrylate,
   (d) 5–40 wt % dialkyl maleate or fumarate,
   (e) 1–5 wt % 2-hydroxyalkyl (meth)acrylate,
   (f) 0.1–1 wt % (meth)acrylamide, and
   (g) 1–5 wt % alpha,beta ethylenically unsaturated carboxylic acid.

2. The composition of claim 1 in which the component (c) alkyl acrylate is 2-ethylhexyl acrylate.

3. The composition of claim 1 in which the component (d) dialkyl maleate or fumarate is dioctyl maleate or dibutyl maleate.

4. The composition of claim 1 in which the component (e) hydroxyalkyl acrylate is hydroxyethyl acrylate.

5. The composition of claim 1 in which the component (f) (meth)acrylamide is acrylamide.

6. The composition of claim 1 in which the component (g) carboxylic acid is acrylic acid.

7. A pressure sensitive adhesive composition comprising an aqueous emulsion of a copolymer having a Tg of less than about −20° C. consisting essentially of
   (a) 10 to 30 wt % vinyl acetate,
   (b) 8 to 20 wt % ethylene,
   (c) 10 to 40 wt % $C_4$–$C_8$ alkyl acrylate,
   (d) 15 to 35 wt % di-($C_4$–$C_8$) alkyl maleate,
   (e) 1 to 4 wt % 2-hydroxyalkyl (meth)acrylate,
   (f) 0.1 to 0.5 wt % (meth)acrylamide, and
   (g) 1 to 4 wt % $\alpha,\beta$-ethylenically unsaturated $C_3$–$C_6$ carboxylic acid.

8. A pressure sensitive adhesive composition comprising an aqueous emulsion of a copolymer having a Tg of −30° to −70° C. consisting essentially of
   (a) 10 to 30 wt % vinyl acetate,
   (b) 8 to 20 wt % ethylene,
   (c) 10 to 40 wt % 2-ethylhexyl acrylate,
   (d) 15 to 35 wt % dioctyl or dibutyl maleate,
   (e) 1 to 4 wt % 2-hydroxyethyl acrylate,
   (f) 0.1 to 0.5 wt % acrylamide, and
   (g) 1 to 4 wt % acrylic acid.

9. The pressure sensitive adhesive composition of claim 1 in which the copolymer has a Tg of −30° to −70° C.

10. The pressure sensitive adhesive composition of claim 7 in which the copolymer has a Tg of −30° to −70° C.

11. The pressure sensitive adhesive composition of claim 8 in which component (d) is dioctyl maleate.

12. The pressure sensitive adhesive composition of claim 8 in which component (d) is dibutyl maleate.

* * * * *